United States Patent
Imoto

(10) Patent No.: US 9,213,504 B2
(45) Date of Patent: Dec. 15, 2015

(54) PRINTING APPARATUS, POWER SUPPLY CONTROL APPARATUS, POWER SUPPLY CONTROL METHOD, AND STORAGE MEDIUM

(71) Applicant: CASIO COMPUTER CO., LTD., Shibuya-ku, Tokyo (JP)

(72) Inventor: Yukinobu Imoto, Hidaka (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/252,187

(22) Filed: Apr. 14, 2014

(65) Prior Publication Data

US 2014/0313537 A1 Oct. 23, 2014

(30) Foreign Application Priority Data

Apr. 17, 2013 (JP) .................................. 2013-086858

(51) Int. Cl.
| | |
|---|---|
| *G06K 15/00* | (2006.01) |
| *G06F 3/12* | (2006.01) |
| *G03G 15/00* | (2006.01) |
| *G06F 1/32* | (2006.01) |

(52) U.S. Cl.
CPC .......... *G06F 3/1221* (2013.01); *G03G 15/5004* (2013.01); *G06F 1/3284* (2013.01); *G06K 15/4055* (2013.01)

(58) Field of Classification Search
CPC .............................. G06F 3/1221; G06F 3/1229
USPC .................................................. 358/1.1–3.29
See application file for complete search history.

(56) References Cited

U.S. PATENT DOCUMENTS

| | | | |
|---|---|---|---|
| 5,995,397 A | 11/1999 | Kim | |
| 6,904,246 B2 | 6/2005 | Nami | |
| 8,508,770 B2* | 8/2013 | Lee et al. | 358/1.15 |
| 2008/0120512 A1* | 5/2008 | Wang | 713/300 |
| 2009/0317112 A1* | 12/2009 | Chae et al. | 399/67 |
| 2011/0012566 A1* | 1/2011 | Sasaki | 320/166 |

(Continued)

FOREIGN PATENT DOCUMENTS

| | | |
|---|---|---|
| JP | 2000177206 A | 6/2000 |
| JP | 2001-138473 A | 5/2001 |

(Continued)

OTHER PUBLICATIONS

Canadian Office Action dated May 19, 2015, issued in counterpart Canadian Application No. 2,849,500.

(Continued)

*Primary Examiner* — Marcellus Augustin
(74) *Attorney, Agent, or Firm* — Holtz, Holtz, Goodman & Chick PC

(57) ABSTRACT

A power supply control apparatus directs a switching device to stop power supply from a first power source to a main body when a power supply disable condition is satisfied in a first state where the main body is powered by the first power source. The power supply control apparatus also directs the switching device to supply power from the first power source to the main body when a power supply enable condition is satisfied in a second state where the power supply from the first power source to the main body is stopped. The power supply control apparatus is powered by a second power source different from the first power source when the main body is in the second state.

4 Claims, 8 Drawing Sheets

(56) References Cited

U.S. PATENT DOCUMENTS

| | | |
|---|---|---|
| 2011/0320842 A1 | 12/2011 | Narushima et al. |
| 2012/0162692 A1 | 6/2012 | Aida et al. |
| 2013/0215449 A1 | 8/2013 | Yamasaki |
| 2013/0219202 A1* | 8/2013 | Iguchi .......................... 713/323 |
| 2014/0063524 A1 | 3/2014 | Mochizuki |

FOREIGN PATENT DOCUMENTS

| | | |
|---|---|---|
| JP | 2003-330312 A | 11/2003 |
| JP | 2006-272636 A | 10/2006 |
| JP | 2011-197127 A | 10/2011 |
| JP | 2012139902 A | 7/2012 |
| JP | 2012-228789 A | 11/2012 |
| JP | 2014048358 A | 3/2014 |

OTHER PUBLICATIONS

Japanese Office Action (and English translation thereof) dated Aug. 25, 2015, issued in counterpart Japanese Application No. 2013-086858.

* cited by examiner

FIG. 3

| FACTOR SATISFYING ENABLE CONDITION | PRINT_READY FLAG |
|---|---|
| (1) RECEPTION OF WAKEUP PACKET | ON |
| (2) PRESSING OF WAKEUP SWITCH | OFF |
| (3) CLOCKING BY RTC | OFF |

PRINTING APPARATUS, POWER SUPPLY CONTROL APPARATUS, POWER SUPPLY CONTROL METHOD, AND STORAGE MEDIUM

CROSS-REFERENCE TO RELATED APPLICATIONS

This application is based upon and claims the benefit of priority from the prior Japanese Patent Application No. 2013-086858, filed Apr. 17, 2013, the entire contents of which are incorporated herein by reference.

FIELD

The application relates to a printing apparatus, a power supply control apparatus, a power supply control method, and a storage medium.

BACKGROUND

A printing apparatus such as a printer typically incorporates power consumption reduction features including automatically turning off power to a main body of the printing apparatus when processing does not take place for some time. Such a known printing apparatus may comprise a switching device such as a relay coupled between the main body of the device and a power source such that power-on and power-off are switched by turning on and off of the switching device. Because of the change in the power states of the printing apparatus by the switching functionality of the switching device, the printing apparatus may be placed in a state of reduced power consumption and restored to a normal state where the device can perform printing process.

In the context of the state of the art techniques of this type, various approaches are available to effectively control the switching of the power states of the printing apparatus. For example, Unexamined Japanese Patent Application Kokai Publication No. 2012-228789 discloses an image forming apparatus that comprises a power switch configured by a relay. The known apparatus may turn off the power switch after entry into a low power consumption state, and/or count the number of times of turning on and off of the power switch and automatically turn off the power switch when it is determined that the number of times exceeds a predetermined threshold. Such an approach allows for not only reduction of negative impacts upon the lifetime of the power switch but also quick turn-off of the power switch.

However, when the power switch is turned off, a power source of a control device that controls the power switch is also turned off. In such a case, it is not possible to control the power switch when power supply to the main body of the printing apparatus is stopped. In view of this, it can be seen that a solution is needed which achieves more effective control of power supply and stoppage thereof to the main body of the printing apparatus regardless of the power states of the printing apparatus. There is also a need for more flexible control of the switching of the power states of the printing apparatus that takes various conditions into account (the conditions may include impacts on the lifetime of the switch and factors that may necessitate change in the power states).

SUMMARY

According to one aspect of the disclosure, there is provided a printing apparatus comprising:
a main body;
a switching device configured to switch between supplying power and stopping supply of power from a first power source to the main body; and
a power supply control apparatus configured to control the switching device to stop power supply from the first power source to the main body when a power supply disable condition is satisfied in a first state where the main body is powered by the first power source, and configured to control the switching device to supply power from the first power source to the main body when a power supply enable condition is satisfied in a second state where the power supply from the first power source to the main body is stopped;
wherein the power supply disable condition is a condition necessitating stoppage of the power supply from the first power source to the main body,
the power supply enable condition is another condition necessitating the power supply from the first power source to the main body, and
the power supply control apparatus is powered by a second power source when the main body is in the second state, the second power source being different from the first power source.

According to another aspect of the disclosure, there is provided
a power supply control apparatus configured to:
control a switching device to stop power supply from a first power source to a main body of a printing apparatus when a power supply disable condition is satisfied in a first state where the main body is powered by the first power source, the switching device being configured to switch supplying power and stopping supply of power from the first power source to the main body, the power supply disable condition being a condition necessitating stoppage of the power supply from the first power source to the main body; and
control the switching device to supply power from the first power source to the main body when a power supply enable condition is satisfied in a second state where the power supply from the first power source to the main body is stopped, the power supply enable condition being another condition necessitating the power supply from the first power source to the main body;
wherein the power supply control apparatus is powered by a second power source when the main body is in the second state, the second power source being different from the first power source.

According to yet another aspect of the disclosure, there is provided
a power supply control method comprising:
a first control step of controlling a switching device to stop power supply from a first power source to a main body of a printing apparatus when a power supply disable condition is satisfied in a first state where the main body is powered by the first power source, the switching device being configured to switch between supplying power and stopping supply of power from the first power source to the main body, the power supply disable condition being a condition necessitating stoppage of the power supply from the first power source to the main body; and
a second control step of controlling the switching device to supply power from the first power source to the main body when an power supply enable condition is satisfied in a second state where the power supply from the first power source to the main body is stopped, the power supply enable condition being another condition necessitating the power supply from the first power source to the main body;

wherein the power supply control apparatus is powered by a second power source when the main body is in the second state, and the second power source being different from the first power source.

According to still another aspect of the disclosure, there is provided a non-transitory storage medium storing a program comprising computer-executable instructions that are executable by a computer to perform operation comprising:

controlling a switching device to stop power supply from a first power source to a main body of a printing apparatus when a power supply disable condition is satisfied in a first state where the main body is powered by the first power source, the switching device being configured to switch between supplying power and stopping supply of power from the first power source to the main body, the power supply disable condition being a condition necessitating stoppage of the power supply from the first power source to the main body;

controlling the switching device to supply power from the first power source to the main body when an power supply enable condition is satisfied in a second state where the power supply from the first power source to the main body is stopped, the power supply enable condition being another condition necessitating the power supply from the first power source to the main body; and supplying power from a second power source to the power supply control apparatus when the main body is in the second state, the second power source being different from the first power source.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the disclosure, and together with the general description given above and the detailed description of the embodiments given below, serve to explain the principles of the disclosure.

FIG. 3 summarizes exemplary correspondences between factors satisfying power supply enable condition and states of Print_Ready flags;

DETAILED DESCRIPTION

Figure 1:
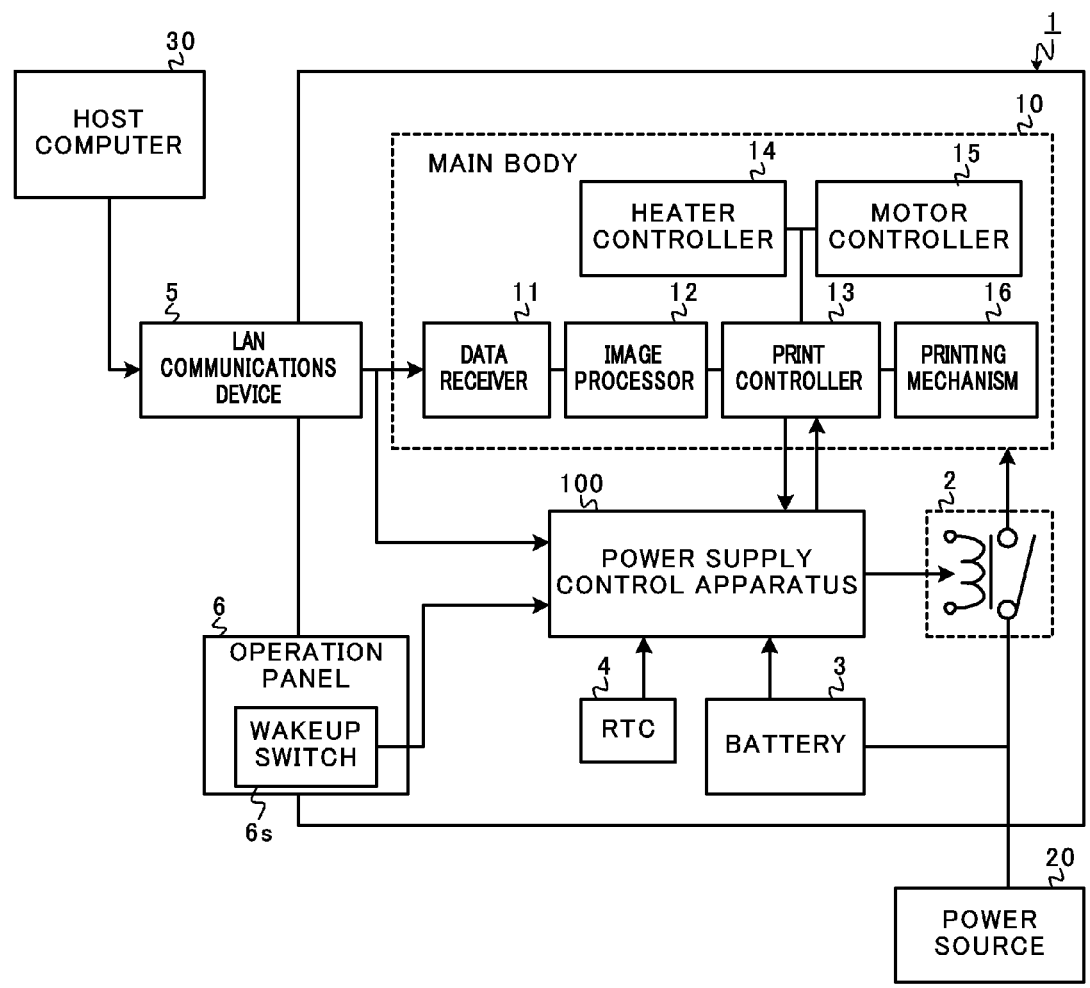
FIG. 1 is a diagram illustrating an exemplary configuration of a printing apparatus that incorporates a power supply control apparatus of the disclosure.

The disclosure is described in exemplary embodiments in the following description with reference to the drawings, in which like reference numerals represent the same or similar throughout the different views.

It is to be understood that the following detailed embodiments are exemplary and explanatory and should not be considered as limiting the scope of the disclosure as claimed. Accordingly, it is appreciated that those skilled in the art would configure embodiments that replace any one of the following elements with equivalents thereof, and such embodiments would also fall within the scope of the disclosure. For better understanding of the disclosure, the following description does not include explicit explanation or reference to known techniques that are not important or relevant in the context of the disclosure.

First Embodiment

FIG. 1 illustrates an exemplary configuration of a printing apparatus that may incorporate a power supply control apparatus according to a first embodiment of the disclosure. The power supply control apparatus 100 of the first embodiment is incorporated in the printing apparatus 1. The power supply control apparatus 100 is configured to control power supply to a main body 10 of the printing apparatus 1.

The printing apparatus 1 is powered by a power source 20. The printing apparatus 1 is configured to perform printing process based on, but not limited to, operation by a user and/or reception of a print request transmitted via a network from an external device such as a host computer 30. It is contemplated that the power source 20 may serve as "a first power source" in the context of the scope of the disclosure. It is also contemplated that the printing apparatus 1 may include a composite machine featuring multiple functions such as copying function, printing function, and facsimile function, or any combination thereof.

Referring to FIG. 1, the printing apparatus 1 comprises a relay 2, a battery 3, a real-time clock (RTC) 4, a local area network (LAN) communications device 5, an operation panel 6, the main body 10, and the power supply control apparatus 100.

The relay 2 is a relay device that opens and closes its contacts. The relay 2 is provided on a transmission line connecting the main body 10 to the power source 20. The relay 2 serves as a switching device adapted to provide and stop power supply from the power source 20 to the main body 10 such that the power supply control apparatus 100 is allowed to control turn-on (closed state) and turn-off (open state) of the relay 2. It is to be understood that the relay 2 may comprise any type of relays including, but not limited to, mechanical relays, semiconductor relays, and other relays whose opening and closing can be controlled by the power supply control apparatus 100.

When the relay 2 is turned on, the main body 10 of the printing apparatus 1 is powered by the power source 20. Thus, a first state is entered in which functional units and components of the main body 10 are allowed to normally operate, and accordingly the printing apparatus 1 is allowed to perform the printing process. The first state is hereinafter referred to as a "normal state." Meanwhile, when the relay 2 is turned off, the power supply from the power source 20 to the main body 10 of the printing apparatus 1 is stopped. Thus, a second state is entered in which the functional units and components of the main body 10 are not allowed to operate, and accordingly the printing apparatus 1 is not allowed to perform the printing process. The second state is hereinafter referred to as a "sleep state."

Specifically, when a predetermined time has passed in a standby state, the printing apparatus 1 turns off the relay 2 to reduce power consumption and enters the sleep sate where the power supply to the main body 10 is stopped. The term "standby state" here refers to a state where the printing process does not take place. Meanwhile, when it is necessary to supply power to the main body 10, for example, when the printing process is to be performed, then the printing apparatus 1 turns on the relay 2 to restart power supply to the main body 10 and thereby exit the sleep state and enter the normal state again.

The battery 3 may comprise a battery cell for storing power obtained from the power source 20 and delivering the stored power to the power supply control apparatus 100. It is contemplated that the battery 3 may serve as "a second power source" in the context of the scope of the disclosure. Since the battery 3 is directly connected to the power source 20 without the relay 2 in between, it is possible to supply power to the power supply control apparatus 100 even when the relay 2 is turned off and the main body 10 of the printing apparatus 1 is not powered by the power source 20.

The RTC 4 may be a timer that employs an oscillator and adapted to clock time. The RTC 4 may include a built-in battery and thereby operate while the main body 10 of the printing apparatus 1 is powered off, so that the RTC 4 can measure a current time and deliver time information including the information corresponding to the current time to the power supply control apparatus 100.

The LAN communications device 5 is a communications interface adapted for various communications with external devices such as the host computer 30 connected via a local area network. For example, the printing apparatus 1 may receive a print request transmitted from the host computer 30 via the LAN communications device 5, and transmit various pieces of information of the printing apparatus 1 to the host computer 30.

The LAN communications device 5 also operates in the sleep state in which the power supply is stopped in a power saving mode. In the sleep state, the LAN communications device 5 receives a start instruction from the external device such as the host computer 30. The start instruction is an instruction for taking the printing apparatus 1 out of the sleep state and placing the printing apparatus 1 in the normal state. The start instruction may comprise a wake-up (WakeUP) packet, which will be described later. The LAN communications device 5 then transmits the received start instruction to the power supply control apparatus 100. Thus, since the LAN communications device 5 can also operate while the printing apparatus 1 is in the sleep state, it is possible to place the printing apparatus 1 in the normal state as required and make the printing apparatus 1 perform the printing process.

The operation panel 6 may comprise an input device including, but not limited to, a display panel such as a liquid crystal display (LCD) and various types of operation buttons. The operation panel 6 is controlled by a not-shown panel controller. The operation panel may display various images, characters, and symbols on the display panel, and receive various input operations that have been made by the user via the input device. It should be noted that the display panel of the operation panel 6 and the input device may comprise touch panels (or touch screens) that may be arranged in a superposed manner.

For example, the operation panel 6 comprises a WakeUP switch 6s as the input device. The WakeUP switch 6s is a startup switch for taking the printing apparatus 1 out of the sleep state and placing the printing apparatus 1 in the normal state (a button that causes exit from the power saving mode). When the user manually presses the WakeUP switch 6s, then pressing information indicative of the user's pressing of the switch 6s is transmitted to the power supply control apparatus 100.

With continued reference to FIG. 1, the main body 10 of the printing apparatus 1 includes various functions for the printing apparatus 1 to perform the printing process. Specifically, the main body 10 comprises a data receiver 11, an image processing unit 12, a print controller 13, a heater controller 14, a motor controller 15, and a printing mechanism 16.

The data receiver 11 is configured to receive a print data that has been transmitted from the host computer 30 via the LAN communications device 5. The data receiver 11 further transmits the received print data to the image processing unit 12.

The image processing unit 12 is configured to perform image processing for the print data that has been received by the data receiver 11. Specifically, the image processing unit 12 analyses a command included in the received print data and converts the print data into a corresponding image data that can be processed by a printer engine. The image processing unit 12 then develops the converted image data in the corresponding memory area of a frame memory in the form of data associated with the respective colors of cyan, magenta, yellow, and black. The image data developed in the frame memory is output to the print controller 13.

The print controller 13 may comprise a central processing unit (CPU). The print controller 13 is configured to control the main body 10 of the printing apparatus 1 using a not-shown read-only memory (ROM) unit and a random access memory (RAM) unit serving as work memory. For example, the print controller 13 may perform the printing process in accordance with the image data that has been generated by the image processing unit 12. The print controller 13 may also control various units and components of the printing mechanism 16 by the heater controller 14 and the motor controller 15.

The heater controller 14 may, under the control of the print controller 13, be configured to control driving of a heater implemented in a fixer of the printing mechanism 16. The motor controller 15 may, likewise under the control of the print controller 13, be configured to control driving of one or more motors implemented in the various units and components of the printing mechanism 16.

The printing mechanism 16 may comprise the printer engine, a conveyor, a plurality of image forming units (for example, image forming units corresponding to cyan, magenta, yellow, and black, respectively), and the fixer. The conveyor may comprise various types of conveying rollers and paper delivery rollers so as to convey recording paper (paper sheet) fed by a paper feeding tray. The image forming unit may comprise a photoreceptor drum, a charging unit, a printing head (light-emitting diode (LED) head), a developing unit, and a transfer unit so as to perform image formation in accordance with the image data generated by the image processing unit 12. The fixer may comprise a heating roller with a built-in heater, and a pressure roller in pressure contact with the heating roller so as to fix the toner output by the image forming unit on the sheets of the recording paper. The sheets of the recording paper upon which the images are output by these units of the printing mechanism 16 are ejected in sequence onto a paper delivery tray.

Figure 2:
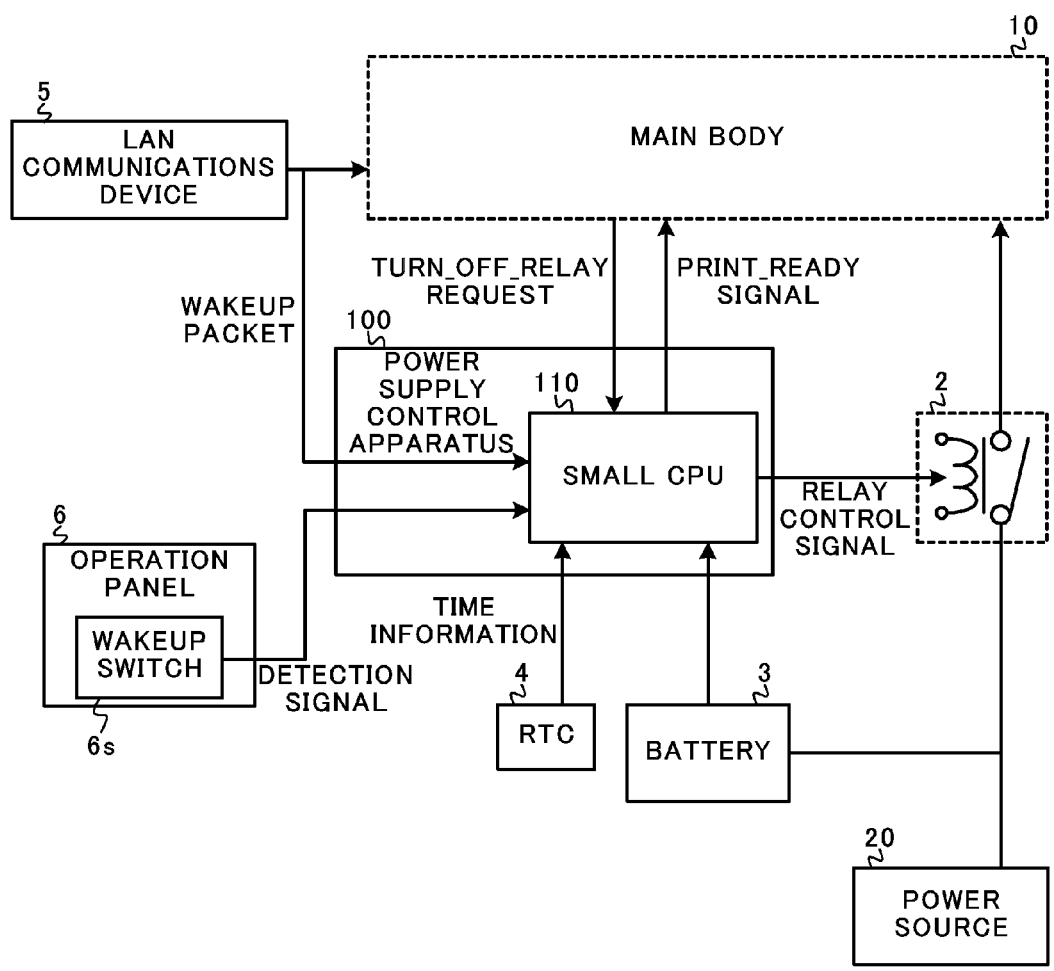
FIG. 2 illustrates an exemplary configuration of the power supply control apparatus along with its relevant units according to a first embodiment.

Turning now to FIG. 2, the configuration of the power supply control apparatus 100 along with its relevant units is described more in detail below.

The power supply control apparatus 100 comprises a small CPU 110. The small CPU 110 is a CPU that can be driven with low power consumption relative to the main body 10 of the printing apparatus 1. The small CPU 110 is powered by the battery 3 and thus continues to operate during the stoppage of the power supply to the main body 10 of the printing apparatus 1 for various processes using the not-shown RAM and ROM units as work memory.

Specifically, the small CPU 110 transmits a relay control signal to the relay 2 and thereby controls switching of turn-on and turn-off of the relay 2. For example, the small CPU 110 controls the relay 2 to supply power to the main body 10 upon satisfaction of a power supply enable condition, for example a condition necessitating power supply to the main body 10, while the relay is turned off (for example while the printing apparatus 1 is in the sleep state).

In this embodiment, the power supply enable condition necessitating power supply to the main body 10 of the printing apparatus 1 is satisfied as a result of either one of the following events 1 to 3:

(1) an instruction has been made by the external device such as the host computer 30 connected via the network to the printing apparatus 1, instructing to take the printing apparatus 1 out of the sleep state and placing the printing apparatus 1 in the normal state;
(2) the user has made input operation using the WakeUP switch 6s of the operation panel 6, instructing to take the printing apparatus 1 out of the sleep state and placing the printing apparatus 1 in the normal state; and
(3) it has been determined as a result of time measurement by the RTC 4 that a time has been reached at which the printing apparatus 1 that has been in the sleep state should be placed in the normal state.

With regard to the case (1), the small CPU 110 receives the WakeUP packet that has been transmitted from the external device such as the host computer 30 via the LAN communications device 5. The WakeUP packet is the startup instruction, such as Magic Packet (registered trademark), for taking the printing apparatus 1 out of the sleep state and placing the printing apparatus 1 in the normal state. The host computer 30 transmits the WakeUP packet so as to taking the printing apparatus 1 out of the sleeping state and placing the printing apparatus 1 in the normal state prior to transmission of the print data when the printing apparatus 1 is to perform the printing process. When the LAN communications device 5 receives the transmitted WakeUP packet, then the LAN communications device 5 forwards the received WakeUP packet to the small CPU 110 of the power supply control apparatus 100. The small CPU 110 in turn determines that the power supply enable condition is satisfied upon reception of the WakeUP packed via the LAN communications device 5.

With regard to the case (2), the small CPU 110 receives a detection signal from the operation panel 6. The detection signal indicates that the WakeUP switch 6s of the operation panel 6 was pressed and the pressing of the switch 6s has been detected. Specifically, when the user presses the WakeUP switch 6s, which is the startup switch, for taking the printing apparatus 1 out of the sleeping state and placing the printing apparatus 1 in the normal state, then the detection signal indicative of the pressing of the switch 6s is transmitted to the small CPU 110 of the power supply control apparatus 100.

When the small CPU 110 has received the transmitted detection signal, the small CPU 110 determines that the power supply enable condition is satisfied.

With regard to the case (3), the time at which the printing apparatus 1 is to be taken out of the sleep state and placed in the normal state may be a monitoring timing for periodically checking various states of the printing apparatus at a predetermined time or at predetermined intervals. As such, the small CPU 110 receives a signal indicative of the time measurement information from the RTC 4, and determines that the power supply enable condition is satisfied when a current time has reached a specified time or when the specified time has elapsed.

Thus, the small CPU 110 determines whether or not the power supply enable condition is satisfied as a result of any one of the factors corresponding to the above cases (1) to (3), and transmits the relay control signal to the relay 2 for turning on the relay 2, so that the power supply is started to the main body 10 upon satisfaction of the power supply enable condition.

Meanwhile, the small CPU 110 controls the relay 2 such that the power supply to the main body 10 is stopped upon satisfaction of a power supply disable condition necessitating stoppage of power supply to main body 10 while the relay 2 is turned on (for example when the printing apparatus 1 is in the normal state).

In this embodiment, the power supply disable condition refers to a condition that necessitates stoppage of power supply to the main body 10 of the printing apparatus 1. The power supply disable condition is satisfied when a request (Turn_Off_Relay request) is received from the print controller 13 of the main body 10, requesting to turn off the relay 2 and stop power supply to the main body 10. Specifically, when a predetermined time has elapsed in the standby state where no printing process takes place, the print controller 13 of the main body 10 transmits the Turn_Off_Relay request to the small CPU 110 to place the printing apparatus 1 in the sleep state. When the Turn_Off_Relay request is received, the small CPU 110 transmits the relay control signal to the relay 2 for turning off the relay 2 and thereby stops power supply to the main body 10.

Thus, the small CPU 110 continues to operate with power consumption lower than that of the main body 10 of the printing apparatus 1 during the stoppage of power supply to the main body 10, and switches turn-on and turn-off of the relay 2 depending upon different conditions. Accordingly, it is made possible to reduce unnecessary power consumption in the printing apparatus 1 and effectively control the power supply and stoppage thereof to the main body 10.

In addition, the small CPU 110 is configured to transmit a Print_Ready signal to the print controller 13 of the main body 10 of the printing apparatus 1. The Print_Ready signal is a selection signal for selecting whether or not process associated with the print preparation should be performed prior to reception of the print data after exit of the printing apparatus 1 from the sleep state and entry of the printing apparatus 1 into the normal state. The term "process associated with the print preparation" refers to a preliminary process to be performed prior to the printing process, which is executable by the printing apparatus 1 prior to reception of the print data by the printing apparatus 1 such as, but not limited to, preceding actuation of the heater and/or the motor.

Typically, even when the printing process does not need to be performed (for example, when the printing apparatus has been started as a result of any event other than the reception of the print data), the printing apparatus such as a printer may perform by default the printing process following exit from the sleep state and entry into the normal state so as to prevent the required time until starting of the printing process from becoming longer. In contrast, the power supply control apparatus 100 according to this embodiment employs the Print_Ready signal and thereby controls whether or not the printing apparatus 1 taken out of the sleep state and placed in the normal state should perform the process associated with the print preparation.

The Print_Ready signal specifies, by means of a Print_Ready flag, information regarding whether or not the printing apparatus 1 should perform in advance the process associated with the print preparation prior to reception of the print data. For example, as illustrated in FIG. 3, the small CPU 110 may previously set the Print_Ready flag as described below for each of the factors corresponding to the above-described cases (1) to (3) satisfying the power supply enable condition. As discussed in the foregoing paragraphs, the power supply enable condition refers to a condition that necessitates power supply to the main body 10 of the printing apparatus 1.

Specifically, when the WakeUP packet is received from the LAN communications device 5 (which corresponds to the case (1)), it is expected that the print data will be transmitted from the device that has transmitted this WakeUP packet. Therefore, the Print_Ready flag is set which indicates that the printing apparatus 1 should perform the print preparation in advance. Meanwhile, when the pressing of the WakeUP switch 6s of the operation panel 6 has been detected (which corresponds to the case (2)) or when it is determined as a result of time measurement by the RTC 4 that the time has been reached at which the relay 2 should be turned on to perform, for example, monitoring of the state of the printing apparatus 1 (which corresponds to the case (3)), then it is not usually expected that the printing process is going to be performed. Therefore, it is determined that the print preparation does not need to be performed, and the Print_Ready flag is cleared.

The small CPU 110 stores the correspondences between the factors satisfying the power supply enable condition and the Print_Ready flag in an appropriate storage device such as a ROM unit. When the power supply enable condition is satisfied, the small CPU 110 generates the Print_Ready signal that includes the Print_Ready flag corresponding to the factor satisfying the corresponding condition. The small CPU 110 then outputs the generated Print_Ready signal to the print controller 13 of the main body 10 when the relay 2 is to be turned on.

Thus, since it is individually determined, depending on the factors necessitating starting of power supply to the main body 10, whether or not the process associated with the print preparation should be performed by the printing apparatus 1, it is possible to perform in advance the print preparation prior to reception of the print data by the printing apparatus when it is expected that the print preparation is necessary, which reduces the required time before starting of the printing process. Meanwhile, when it is expected that the print preparation is not necessary, then the printing apparatus does not perform the print preparation following the startup. Accordingly, it is possible to prevent unnecessary power consumption and occurrence of noises.

Operation of the above-described small CPU 110 implemented in the power supply control apparatus 100 is now described with reference to a flowchart of FIG. 4. The flowchart of FIG. 4 corresponds to the process that is started when the relay 2 is turned off (for example when the printing apparatus 1 is placed in the sleep state).

When the relay 2 is turned off, the small CPU 110 determines whether or not the LAN communications device 5 has received the WakeUP packet (the step S101). Specifically, the small CPU 110 determines whether or not the power supply enable condition is satisfied by the factor of the above case (1). The power supply enable condition necessitates, in general as has been described in the foregoing, power supply to the main body 10 of the printing apparatus 1 that has been placed in the sleep state.

When the WakeUP packet is received (YES in the step S101), the small CPU 110 transmits the relay control signal and thereby turns on the relay 2 (the step S102), so that the printing apparatus 1 is taken out of the sleep state and placed in the normal state.

After the relay 2 is turned on, the small CPU 110 sets the Print_Ready flag, and outputs the Print_Ready signal to the print controller 13 of the main body 10 (the step S103). Specifically, when the printing apparatus 1 is started as a result of reception of the WakeUP packet, then the small CPU 110 directs the printing apparatus 1 to perform the print preparation by starting actuation of the heater and the motor prior to reception of the print data by the started printing apparatus 1.

Meanwhile, when the WakeUP packet has not been received (NO in the step S101), the small CPU 110 determines whether or not the pressing of the WakeUP switch 6a of the operation panel 6 has been detected (the step S104). Accordingly, the small CPU 110 determines whether or not the power supply enable condition has been satisfied as a result of the factor of the above case (2).

When the pressing of the WakeUP switch 6s has been detected (YES in the step S104), the small CPU 110 transmits the relay control signal and thereby turns on the relay 2 (the step S105), and takes the printing apparatus 1 out of the sleep state and places the printing apparatus 1 in the normal state.

When the relay 2 is turned on, the small CPU 110 clears the Print_Ready flag and then outputs the Print_Ready signal to the print controller 13 of the main body 10 (the step S106). Specifically, when the printing apparatus 1 has been started as a result of detection of the pressing of the WakeUP switch 6s, the small CPU 110 directs the started printing apparatus 1 to not perform the process associated with the print preparation.

Meanwhile, when there is no detection of pressing of the WakeUP switch 6s (NO in the step S104), the small CPU 110 determines as a result of time measurement by the RTC 4 whether or not the time has been reached at which the printing apparatus 1 is to be taken out of the sleep state and placed in the normal state (the step S107). Specifically, the small CPU 110 determines whether or not the power supply enable condition has been satisfied by the factor of the above case (3).

When the time has been reached at which the printing apparatus 1 should be started (YES in the step S107), the small CPU 110 transmits the relay control signal and thereby turn on the relay 2 (the step S108), and takes the printing apparatus 1 out of the sleep state and places the printing apparatus 1 in the normal state.

When the relay 2 is turned on, the small CPU 110 sets clears the Print_Ready flag and then outputs the Print_Ready signal to the print controller 13 of the main body 10 (the step S109). Specifically, when the printing apparatus 1 has been started as a result of the time being reached at which the printing apparatus 1 should be started, which is determined based on the time measurement by the RTC 4, the small CPU 110 directs the started printing apparatus 1 not to perform the process associated with the print preparation.

Thus, the small CPU 110 determines, depending on the factors satisfying the power supply enable condition, whether or not the process associated with the print preparation should be performed by the printing apparatus 1, outputs the Print- _Ready signal, and thereby notifies the print controller 13 of the main body 10 about the result of determination. It is contemplated that the small CPU 110 serves as a determiner and an output device in the context of the scope of the disclosure.

Further, when the timing has not been reached at which the printing apparatus 1 should be started (NO in the step S107), the process of the small CPU 110 goes back to the step S101. Accordingly, the small CPU 110 will repeat the steps S101, S104, and S107 until satisfaction of the power supply enable condition as a result of either one of the factors of the cases (1) to (3) while the printing apparatus 1 remains in the sleep state.

Meanwhile, when the printing apparatus 1 is placed in the normal state through turning on the relay 2 as a result of any one of the factors of the cases (1) to (3), then the process of the small CPU 110 proceeds to the switching of the relay 2 from turn-on to turn-off (for example the relay 2 that has been operating is to be turned off). When the relay 2 is turned on and operating, the small CPU 110 determines whether or not turning off of the relay 2 has been requested by the print controller 13 of the main body 10 of the printing apparatus 1 (the step S110).

When there is no request to turn off the relay 2 (NO in the step S110), the process of the small CPU 110 remains at the step S110. Specifically, the small CPU 110 waits for reception of the request by the print controller 13 of the main body 10 to turn off the relay 2 and stop power supply to the main body 10, as long as the main body 10 is powered by the power source 20 and the printing apparatus 1 operates in the normal state.

When turning off of the relay 2 is requested by the print controller 13 of the main body 10 (YES in the step S110), the small CPU 110 transmits the relay control signal and thereby turns off the relay 2 (the step S111), and places the printing apparatus 1 in the sleep state. Thus, when the relay 2 is turned off, the process of the small CPU 110 goes back to the step S101 and the small CPU 110 waits until the condition to turn on the relay 2, which has been turned off, is satisfied.

Figure 5:
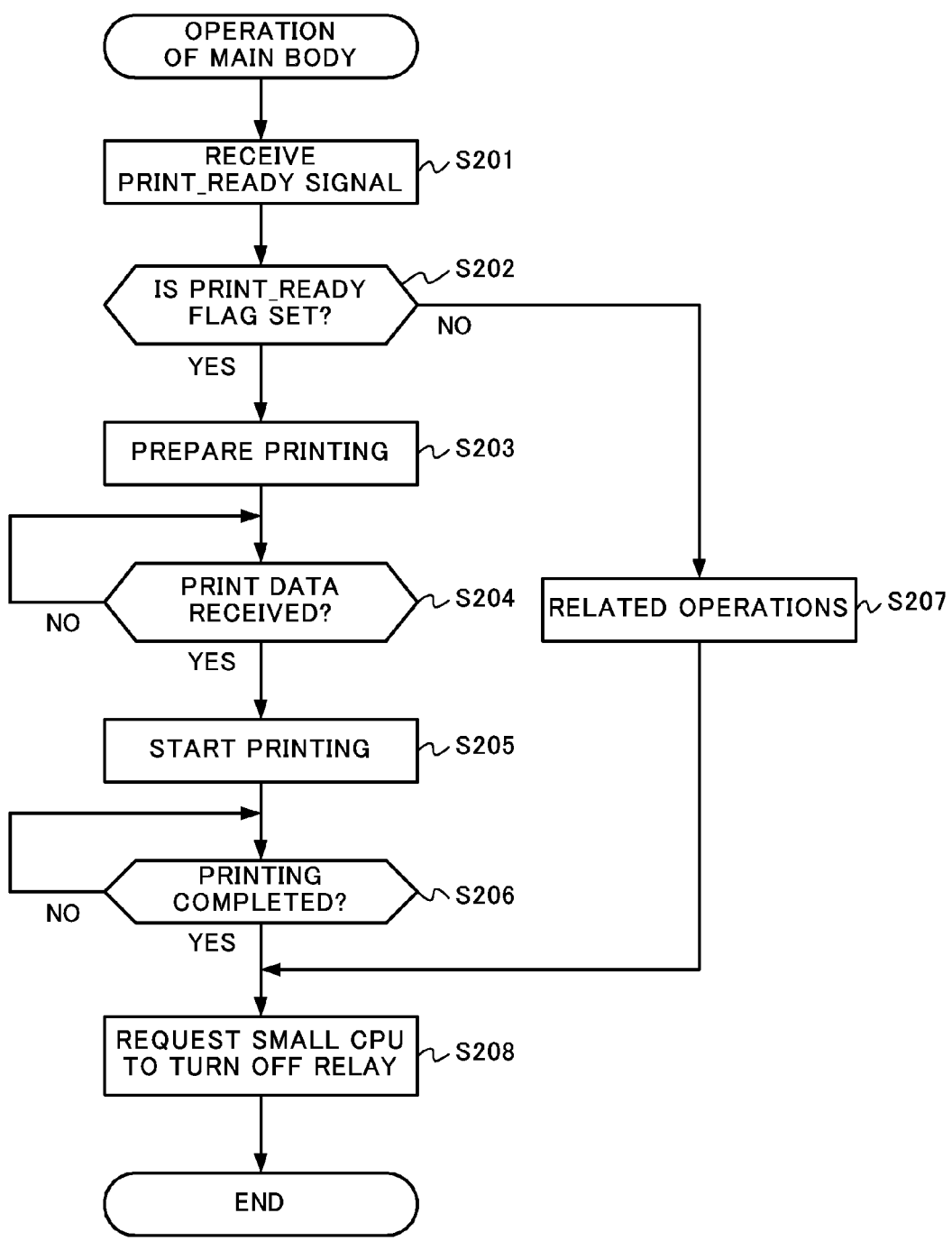
FIG. 5 is a flowchart illustrating the operation of a main body of the printing apparatus.

The operation of the main body 10 of the printing apparatus 1 is described in detail below with reference to a flowchart of FIG. 5. The process of the flowchart of FIG. 5 is started when the relay 2 that was turned off is turned on and power supply is started from the power source 20 to the main body 10.

When the relay 2 is turned on and the printing apparatus 1 is taken out of the sleep state and placed in the normal state, then the print controller 13 receives the Print_Ready signal that has been output from the small CPU 110 of the power supply control apparatus 100 (the step S201). The print controller 13 then determines whether or not the Print_Ready flag included in the received Print_Ready signal is set (the step S202).

When the Print_Ready flag is set (YES in the step S202), the print controller 13 performs the process associated with the print preparation (the step S203). Specifically, as the process associated with the print preparation, the print controller 13 controls the heater controller 14, directing the heater controller 14 to start heating of the fixer of the printing mechanism 16, and controls the motor controller 15, directing the motor controller 15 to perform necessary initialization for driving various motors needed for conveyance of the recording paper in the printing mechanism 16 and image formation. Thus, when the Print_Ready flag is set, the print controller 13 performs processes that can be done prior to the reception of the print data and thereby reduces the time required before the printing process is started.

Following the process associated with the print preparation, the print controller 13 determines whether or not the print data has been received (the step S204). Specifically, the print controller 13 determines the print data, for which the printing process is to be performed, has been received from an external device such as the host computer 30 via the LAN communications device 5 and the data receiver 11.

When the print data has not been received (NO in the step S204), the process of the main body 10 remains at the step S204. Specifically, the print controller 13 waits for the print data to be received.

Meanwhile, when the print data has been received (YES in the step S204), the print controller 13 starts the printing process of the received print data (the step S205). Specifically, the print controller 13 controls the image processing unit 12 to generate image data based on the received print data, and controls the printing mechanism 16 to perform the printing process in accordance with the generated image data.

The print controller 13 then prints the received print data until the printing process is completed. Specifically, the print controller 13 determines whether or not the printing process of the received print data has been completed (the step S206). When it is determined that the printing is not completed (NO in the step S206), the print controller 13 performs the printing process for the received print data until the received print data is completely printed.

Meanwhile, in the step S202, if the Print_Ready flag included in the Print_Ready signal received from the small CPU 110 of the power supply control apparatus 100 is cleared (NO in the step S202), then the print controller 13 does not perform the process associated with the print preparation, but performs various processes other than the printing process (the step S207).

For example, when the WakeUP switch 6s of the operation panel 6 is pressed and the printing apparatus 1 is started, then the print controller 13 makes the operation panel 6 operate and display various pieces of information on the display panel and receive various operation inputs by the user via the input device. In addition, when it is determined as a result of time measurement by the RTC 4 that the timing of monitoring the state of the printing apparatus 1 has been reached and the printing apparatus 1 is started, then the print controller 13 performs various monitoring processes to obtain the states of the units and components of the printing apparatus 1.

When the printing process has been completed in the step S206 (YES in the step S206), or when various processes are performed in the step S207, then the print controller 13 requests the small CPU 110 to turn off the relay 2 (the step S208). Subsequently, the operation of the main body 10 ends as illustrated in the flowchart of FIG. 5.

Specifically, when processes including the printing process have been completed and there remains no processes that are yet to be performed, print controller 13 transmits the Turn_Off_Relay request to the small CPU 110 so as to stop power supply from the power source 20 to the main body 10 and place the main body 10 in the sleep state for reduction in power consumption. For example, when the standby state, where there is no process that should be performed, continues for a predetermined time equal to or larger than a predefined upper time limit, then the print controller 13 transmits the Turn_Off_Relay request to the small CPU 110 and places the printing apparatus 1 in the sleep state.

As discussed in the foregoing paragraphs, when the printing apparatus 1 is in the sleep state, the power supply control apparatus 100 according to the first embodiment starts the printing apparatus 1 in the normal state upon satisfaction of the condition necessitating startup of the printing apparatus 1 in the normal state. When the printing apparatus 1 is in the normal state, the power supply control apparatus 100 places the printing apparatus 1 in the sleep state in accordance with the request from the print controller 13 of the main body 10. In addition, the power supply control apparatus 100 according to the first embodiment controls whether or not to make the printing apparatus 1 perform the process associated with the print preparation depending upon the factors necessitating start of power supply to the main body 10. Accordingly, it is made possible to achieve both the reduction of required time before the printing process is started and prevention of occurrence of unnecessary noises.

Second Embodiment

The following paragraphs describe the power supply control apparatus according to a second embodiment of the disclosure.

The power supply control apparatus 100 according to the second embodiment includes a feature of controlling a number of times of switching of the relay 2 to ensure service life of the relay 2 along with above-described features of the power supply control apparatus 100 according to the first embodiment.

Specifically, a typical switching device such as the relay 2 involves the limited number of times of opening/closing of the contacts. The contacts may be damaged when the limit has been exceeded, which may cause malfunction in the switching of turn-on and turn-off of the device. As such, it is necessary to control the number of times of switching of the relay 2. However, the timing at which the printing apparatus 1 is started may be undefined and not easy to be restricted, and accordingly it is difficult to control the timing at which the relay that has been turned on and operating should be turned off. In view of this, the power supply control apparatus 100 according to the second embodiment controls the number of times of switching of the relay 2 through controlling the timing at which the relay 2 that has been turned on and operating should be turned off.

In this context, the small CPU 110 controls the relay 2 to be turned off, stops power supply to the main body 10, and stores the time at which the power supply was stopped in an appropriate storage device such as a RAM unit or the like. When a permissible time has not elapsed since the time of the last turning off of the relay 2, the relay 2 that has been turned on and operating will not be turned off even when the print controller 13 of the main body 10 has made the request to turn off the relay 2, and thus the number of times of switching of the relay 2 is controlled.

Figure 6:
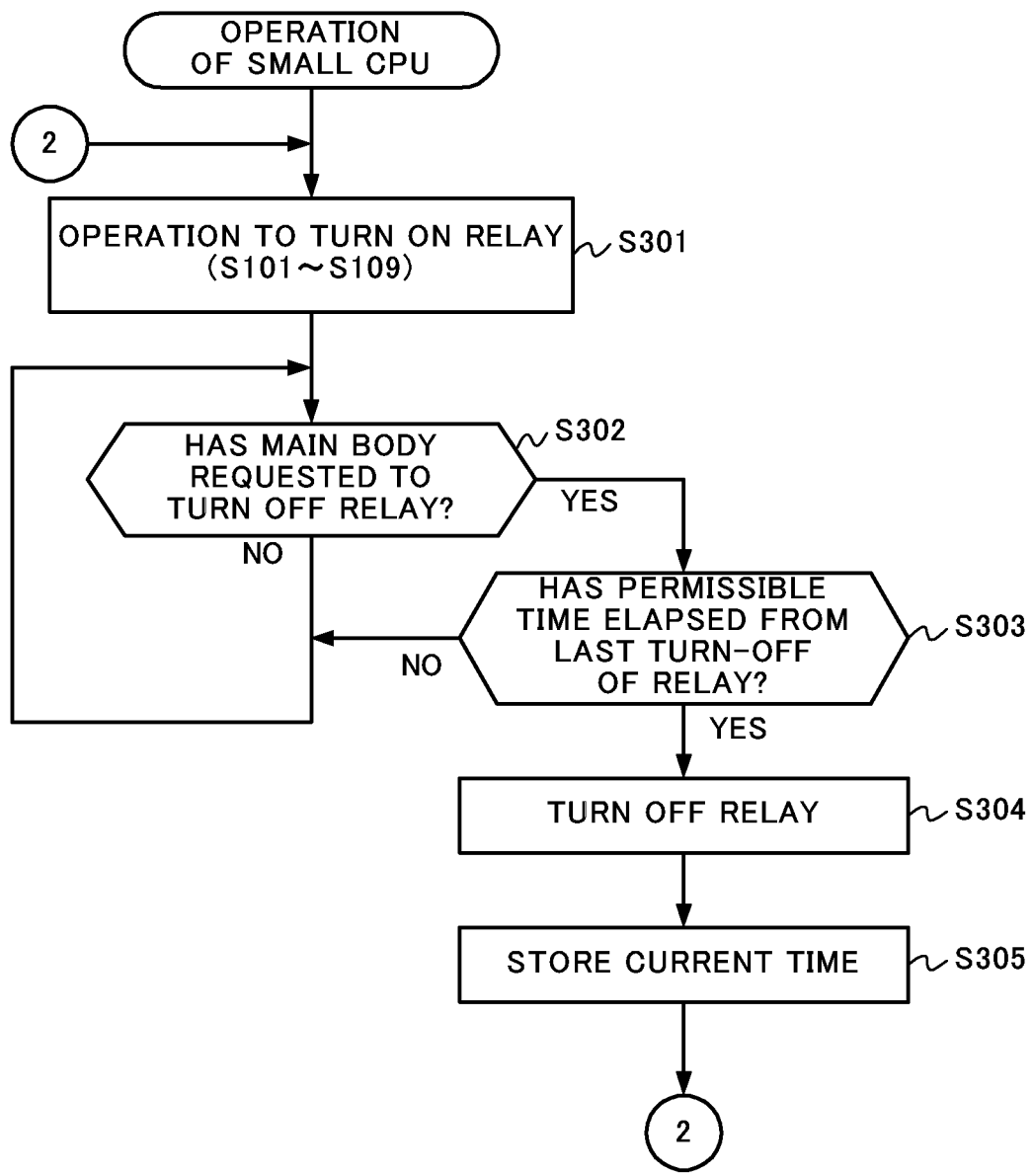
FIG. 6 is a flowchart illustrating the process of the small CPU according to a second embodiment of the disclosure.

The process of the small CPU 110 is described with reference to a flowchart of FIG. 6. The process corresponding to the flowchart of FIG. 6 begins when the relay 2 is turned off, for example when the printing apparatus 1 is in the sleep state.

When the relay 2 is turned off, the small CPU 110 performs the switching process for turning on the relay 2 that has been turned off (the step S301), in the same or similar manner as in the switching process in the first embodiment for turning on the relay that has been turned off (the steps S101 to S109). Specifically, the small CPU 110 turns on the relay 2 and start the printing apparatus 1 when the power supply enable condition, which necessitates power supply to the main body 10 of the printing apparatus 1, is satisfied. The small CPU 110 then determines, depending on the factor as a result of which the power supply enable condition was satisfied, whether or not to direct the printing apparatus 1 to perform the process associated with the print preparation, and outputs the Print_Ready signal and thereby notifies the print controller 13 of the main body 10 about the result of determination.

When the printing apparatus 1 is placed in the normal state and the process of the small CPU 110 proceeds to the process for turning on the relay 2 that has been turned off, then the small CPU 110 determines whether or not turning off of the relay 2 has been requested by the print controller 13 of the main body 10 of the printing apparatus 1 (the step S302).

When there is no request to turn off the relay 2 (NO in the step S302), the process of the small CPU 110 remains at the step S110. Specifically, the small CPU 110 waits for reception of a request to turn off the relay 2 and stop the power supply to the main body 10 being transmitted from the print controller 13 of the main body 10 while the main body 10 is powered by the power source 20 and the printing apparatus 1 operates in the normal state.

When the request to turn off the relay 2 has been made by the print controller 13 of the main body 10 (YES in the step S302), the small CPU 110 determines whether or not an elapsed time is equal to or larger than the permissible time, where the elapsed time is defined by the current time and the time at which the relay 2 was lastly turned off (the step S303). Specifically, the small CPU 110 reads from the storage device such as a RAM unit or the like, the time at which the relay 2 was lastly turned off, and obtains the information corresponding to the current time from the RTC 4, and determines whether or not the elapsed time between the read-out time and the current time is equal to or larger than the permissible time. It is contemplated that the small CPU 110 serves as a second determiner in the context of the scope of the disclosure.

The term "permissible time" refers to an interval of switching operations of the relay 2. The "interval of switching operations of the relay 2" is defined based on the operating time and the lifetime of the relay 2. The operating time of the relay 2 is defined in accordance with the operating time and the lifetime of the printing apparatus 1. The lifetime of the relay 2 is defined in accordance with the specifications of the relay 2. For example, when it is estimated that the contacts of the relay 2 reach their life end with one hundred thousand times of closing/opening operations and it is assumed that the operating time per day is eight (8) hours, then the period of opening/closing operations of the relay 2 (for example the time interval between a previous turn-off operation and another turn-off operation that follows, or the time interval between a previous turn-on operation and another turn-on operation that follows) has to be not less than about 8.8 minutes in order to let the relay 2 continue to operate for five (5) yeas (14,600 hours) of the lifetime of the printing apparatus 1 of (14,600 hours/100,000 hours). Therefore, the small CPU 110 may set the permissible time to ten (10) minutes, and store information corresponding to the permissible time in the storage device such as a ROM unit or the like.

In the step S303, when it is determined that the time period defined by the current time and the time at which the relay 2 was last turned off is less than the permissible time (NO in the step S303), then the process of the small CPU 110 goes back to the step S302. Specifically, the small CPU 110 does not turn on or off the relay 2 such that the printing apparatus 1 is kept in the normal state in order to restrict the number of times of switching operations of the relay 2 and thereby ensure longer lifetime of the relay 2.

Meanwhile, when it is determined that the elapsed time is equal to or larger than the permissible time (YES in the step S303), then the small CPU 110 transmits the relay control signal and thereby turns off the relay 2 (the step S304). Thus, the small CPU 110 stops power supply to the main body 10 of the printing apparatus 1 and places the printing apparatus 1 in the sleep state.

The small CPU 110 then stores the current time measured by the RTC 4 in a RAM unit or the like (the step S305), and thereby updates the previously stored information. The updated time will serves as the criterion in determining whether or not the permissible time has elapsed when the Turn_Off_Relay request is made for the next time from the print controller 13 of the main body 10.

Thus, when the relay 2 is turned off, the process of the small CPU 110 goes back to the step S301, for example the switching process of turning on the relay 2 when the printing apparatus 1 is in the sleep state.

As discussed in the foregoing paragraphs, the power supply control apparatus 100 according to the second embodiment controls the switching timing of the relay 2 such that the time period from the time at which the relay was turned off to the time at which the relay 2, which is turned on and operating, is for the next time turned off becomes equal to or larger than the permissible time. For example, controlling the time between the previous turning on of the relay 2 and the subsequent turning off of the relay 2 (for example the time during which the printing apparatus 1 operates) has less impacts upon the frequency of the switching operations of the relay 2 than controlling the time between the previous turning off of the relay 2 and the subsequent turning on of the relay 2 (for example, the time during which the printing apparatus 1 in the sleep state) The former mode of control facilitates more accurate management of the lifetime of the relay 2.

In addition, because of the time management by the power supply control apparatus 100, which can operate even when the printing apparatus 1 is in the sleep state, it is made possible to precisely control the switching timings of the relay 2. Accordingly, unnecessary operating time that may compromise the power saving capability can be effectively eliminated with the lifetime of the relay 2 duly taken into account, making it possible to achieve both the sufficient lifetime of the relay 2 and reduction of unnecessary power consumption.

Third Embodiment

The following paragraphs describe the power supply control apparatus according to a third embodiment of the disclosure.

The configuration of the power supply control apparatus 100 along with its relevant units according to the third embodiment is described with reference to FIG. 7.

Figure 7:
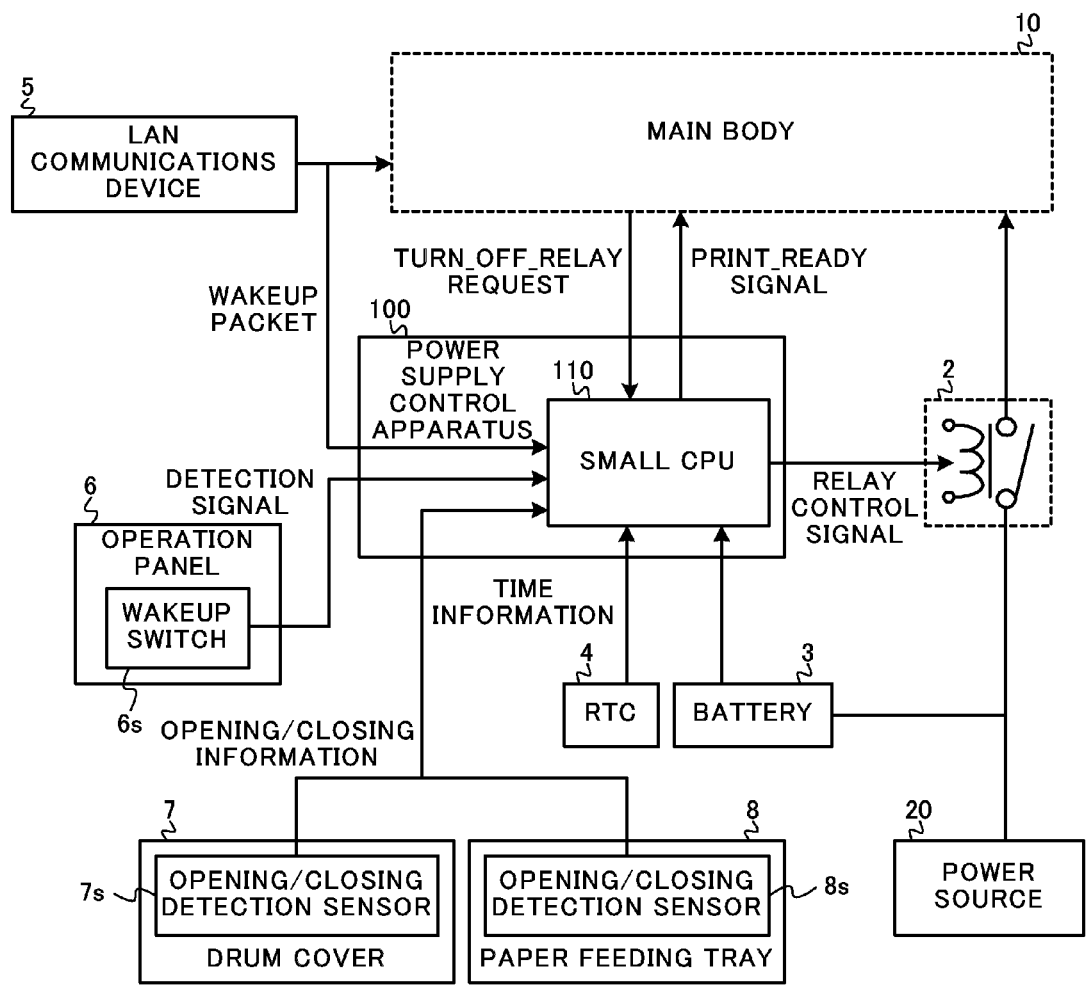
FIG. 7 illustrates an exemplary configuration of the power supply control apparatus along with its relevant units according to a third embodiment of the disclosure.

Referring to FIG. 7, the small CPU 110 in the power supply control apparatus 100 is connected to the relay 2, the battery 3, the RTC 4, the LAN communications device 5, the operation panel 6, and the main body 10, respectively, via appropriate transmission lines so as to perform the operations and processes described in relation to the first embodiment and the second embodiment. In the third embodiment, the small CPU 110 is further connected to an opening/closing detection sensor 7s implemented in or on a drum cover 7 and an opening/closing detection sensor 8s implemented in or on a paper feeding tray 8 so as to obtain opening/closing information of the drum cover 7 and the paper feeding tray 8.

The drum cover 7 is a member adapted to cover a photoreceptor drum for protection thereof. The drum cover 7 may be operable to be opened by the user who replaces the drum unit near the end of its life. When the drum cover 7 is opened, the light incident on the photoreceptor may affect the accuracy of image formation. It is accordingly necessary to perform again a process associated with color matching. The process associated with the color matching refers to one or more processes involved in performing tentative primary transfer, reading the result of the primary transfer using a reading sensor, thereby detecting any deviation from standard colors, and adjusting output of colors in the image formation.

With regard to the process associated with the color matching, a typical printer, which does not include an opening/closing determiner adapted to determine whether or not the drum cover 7 has been opened during the sleep state, often performs the same operation again at every entry into the normal state even when the drum cover 7 is not opened. In contrast, the power supply control apparatus 100 according to the third embodiment determines whether or not the drum cover 7 has been opened by means of opening/closing detection by the opening/closing detection sensor 7s. When the drum cover 7 was not opened during the sleep state of the printing apparatus 1, the power supply control apparatus 100 directs the printing apparatus 1 upon entry into the normal state to omit the process associated with the color matching.

The paper feeding tray 8 is an accommodation member adapted to receive the recording paper (sheets) for recording of the print data corresponding to the print request. The recording paper sheets placed in the paper feeding tray 8 are delivered in sequence to the conveyor of the printing mechanism 16 in accordance with the print request. At this point, the position of the sheets of the recording paper is adjusted. Specifically, the sheets of the recording paper placed in the paper feeding tray 8 are elevated by an appropriate motor such that the uppermost one of the sheets of the recording paper in the paper feeding tray 8 is positioned to be at a paper feed start position to ensure that the sheets of the recording paper are allowed to be smoothly supplied regardless of the amount of the remaining sheets. Meanwhile, this position adjustment for the recording paper is reset when the paper feeding tray 8 is opened by the user who may want to refill the sheets of the recording paper. Accordingly, it is necessary to perform again the operation associated with the adjustment of the position of the recording paper when the paper feeding tray 8 is opened.

With regard to the process associated with the adjustment of the position of the recording paper, typical printers that do not include a second opening/closing determiner adapted to determine whether or not the paper feeding tray 8 has been opened during the sleep state, often perform the same operation again at every entry into the normal state even when the paper feeding tray 8 is not opened. In contrast, the power supply control apparatus 100 according to the third embodiment determines whether or not the paper feeding tray 8 has been opened by means of opening/closing detection by the opening/closing detection sensor 8s. When the paper feeding tray 8 was not opened during the sleep state of the printing apparatus 1, the power supply control apparatus 100 directs the printing apparatus 1 upon entry into the normal state to omit the process associated with the adjustment of the position of the recording paper.

The process of the small CPU 110 associated with opening/closing determination of the drum cover 7 and the paper feeding tray 8 is described with reference to a flowchart of FIG. 8.

Figure 4:
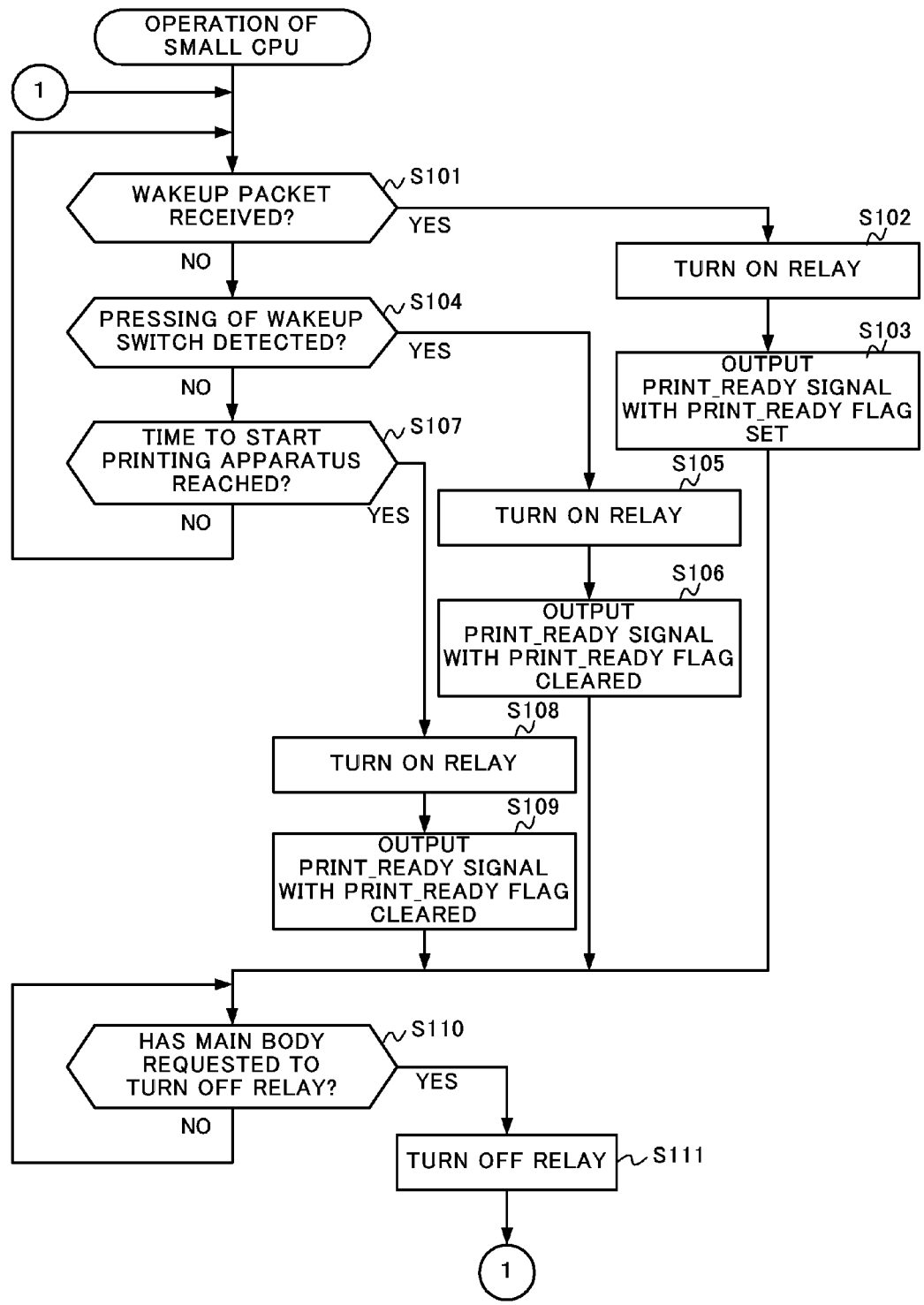
FIG. 4 is a flowchart illustrating the operation of a small CPU according to the first embodiment of the disclosure.
Figure 8:
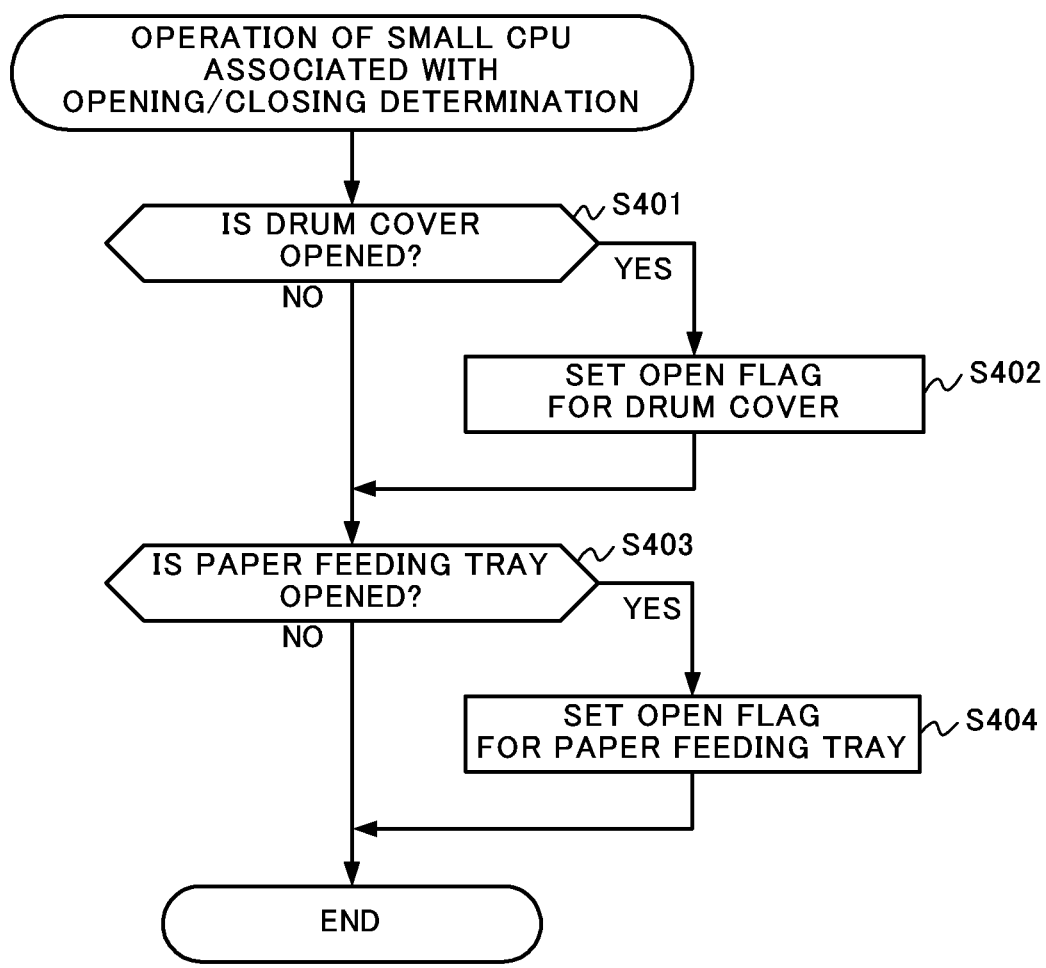
FIG. 8 is a flowchart illustrating the process of the small CPU of the third embodiment of the disclosure in the context of opening/closing determination of a drum cover and a paper feeding tray.

Referring to FIG. 8, the process of the small CPU 110 in this flowchart is performed at any appropriate timing when the relay 2 is turned off and accordingly the printing apparatus 1 is in the sleep state (for example, while the results of determination of the steps S101, S104, and S107 in the flowchart of FIG. 4 are all NO).

When the relay 2 is turned off, the small CPU 110 determines whether or not the drum cover 7 has been opened (the step S401). Specifically, the small CPU 110 obtains an opening/closing information from the opening/closing detection sensor 7s implemented in or on the drum cover 7 and determines whether or not the drum cover 7 has been opened.

When it is determined that drum cover 7 has been opened (YES in the step S401), the small CPU 110 sets an Open flag of the drum cover 7 (the step S402). The Open flag of the drum cover 7 is a flag that is cleared for initialization upon entry of the printing apparatus 1 into the sleep state. The Open flag is set when the drum cover 7 is opened at least once while the printing apparatus 1 is in the sleep state.

When the open flag of the drum cover 7 is set, or when it is not determined that the drum cover 7 is opened (NO in the step S401), then the small CPU 110 determines whether or not the paper feeding tray 8 has been opened (the step S403). Specifically, the small CPU 110 obtains an opening/closing information from the opening/closing detection sensor 8s implemented in or on the paper feeding tray 8 and determines whether or not the paper feeding tray 8 has been opened.

When it is determined that the paper feeding tray 8 has been opened (YES in the step S403), the small CPU 110 sets an Open flag of the paper feeding tray 8 to ON (the step S404). The Open flag of the paper feeding tray 8, as in the case of the Open flag of the drum cover 7, is a flag that is cleared for initialization upon entry of the printing apparatus 1 into the sleep state. The Open flag is set when the paper feeding tray 8 is opened at least once while the printing apparatus 1 is in the sleep state.

The process of the small CPU 110 in FIG. 8 ends when the Open flag of the paper feeding tray 8 is set, or when it is not determined that the paper feeding tray 8 has been opened (NO in the step S403). The small CPU 110 performs the process associated with detection of opening/closing of the drum cover 7 and the paper feeding tray 8 at any timing while the printing apparatus 1 is in the sleep state, and determines whether or not the drum cover 7 and paper feeding tray 8 are each opened at least once.

When it is determined that the drum cover 7 was not opened (for example, when the Open flag of the drum cover 7 remained to be cleared) prior to the next round of satisfaction of the power supply enable condition, then the small CPU 110 notifies the print controller 13 of the main body 10 and directs the print controller 13 not to perform process associated with color matching upon entry of the printing apparatus 1 in the normal state. It is contemplated that the small CPU 110 serves as a notifier in the context of the scope of the disclosure. As discussed in the foregoing paragraphs, the power supply enable condition is the condition that necessitates power supply to the main body 10 of the printing apparatus 1.

Likewise, when it is determined that the paper feeding tray 8 was not opened (for example, when the Open flag of the paper feeding tray 8 remains to be cleared) prior to the next round of satisfaction of the power supply enable condition, then the small CPU 110 notifies the print controller 13 of the main body 10 and directs the controller 13 not to perform process associated with position adjustment of the recording paper received in the paper feeding tray upon entry of the printing apparatus 1 into the normal state. It is contemplated that the small CPU 110 serves as a second notifier in the context of the scope of the disclosure. The power supply enable condition is the condition that necessitates power supply to the main body 10 of the printing apparatus 1.

These notifications may be output from the small CPU 110 to the print controller 13 of the main body 10, for example, as part of the Print_Ready signal.

As discussed in the foregoing paragraphs, in the power supply control apparatus 100 according to the third embodiment, the small CPU 110 monitors opening/closing operations of the drum cover 7 and the paper feeding tray 8 while the printing apparatus 1 is in the sleep state, and the small CPU 110 controls the printing apparatus 1 to perform the process associated with the color matching and position adjustment when and only when it is required. Accordingly, it is made possible to reduce the time required for initialization process that has to be performed upon startup of the printing apparatus 1.

Other Alternative Embodiments

Although the exemplary embodiments of the disclosure have been described in the foregoing sections and paragraphs, it is also possible to combine the units and components of the first to third embodiments in any combinations depending upon actual applications of the disclosure. In addition, the above embodiments are presented in an illustrative fashion and therefore the specific terms and phrases should not be considered as limiting the scope of the disclosure. In other words, the embodiments of the disclosure may be applied in various ways, and any alternate embodiments conceivable based on the explicitly and specifically illustrated embodiments will also fall within the scope of the disclosure.

For example, in the above embodiments, the power supply enable condition necessitating power supply to the main body 10 of the printing apparatus 1 is satisfied as a result of either one of the cases (1) to (3). Nevertheless, the power supply control apparatus according to the disclosure may be implemented such that the power supply enable condition is only satisfied in one or two of the above three cases (1) to (3), or such that the power supply enable condition is satisfied as a result of any factors other than these three factors.

An example of the factors other than the above three factors satisfying the power supply enable condition may correspond to a case of taking the printing apparatus 1 out of the sleep state and restoring the printing apparatus 1 in the normal state, and then actuating the motor after the temperature of the heater decreased to some extent in order to assess the actuation of the motor that is not heated by the heater. In this case, the power supply control apparatus 100 may be configured such that the power supply enable condition is satisfied even when the temperature of the heater provided within the printing mechanism 16 becomes equal to or lower than a permissible temperature.

Specifically, the heater provided inside of the printing mechanism 16 may be equipped with an appropriate temperature sensor so that the small CPU 110 of the power supply control apparatus 100 can obtain a temperature information regarding the temperature of the heater using this temperature sensor while the printing apparatus 1 is in the sleep state. Thus, when the temperature of the heater becomes equal to or lower than a predetermined permissible temperature, the small CPU 110 turns on the relay 2 to supply power to the main body 10 and thereby activate the printing apparatus 1. Since the printing process is not intended at this point, the Print_Ready flag is cleared. Meanwhile, the small CPU 110 outputs the Print_Ready signal to the print controller 13 of the main body 10, the Print_Ready signal including information that indicates that the system is at the timing at which assessment of the actuation of the motor should be performed, and makes the print controller 13 perform the motor actuation assessment. It should be noted that the small CPU 110 serves as a temperature acquirer in the context of the scope of the disclosure.

In addition, in the above-described embodiments, the power supply control apparatus 100 is provided inside of the printing apparatus 1. It can also be contemplated that the power supply control apparatus of the disclosure may be provided outside of the printing apparatus 1 as long as apparatus is capable of controlling the relay 2 that switches power supply and stoppage thereof to the main body 10 of the printing apparatus 1.

Further, in the above described embodiments, the power supply control apparatus 100 is driven by the battery 3 serving as the power source. It can also be contemplated that the power source is not limited to the battery having power storage functionality such as the battery 3 and the power supply control apparatus of the disclosure may be driven by a small-capacity power source. Specifically, in the context of a power source supplying power to the power supply control apparatus, it is possible to use any power source that can enable the power supply control apparatus to operate while power supply to the main body 10 is stopped.

It is appreciated that the disclosure can be configured as the power supply control apparatus that is specially designed for implementation of the features of the disclosure. However, it should be noted that the disclosure may be implemented as a program configured for allowing existing personal computers and information terminal devices to serve as the power supply control apparatus of the disclosure. Specifically, the program configured to implement the power supply control apparatus 100 and its functional units and components of the above-described exemplary embodiments may be applied such that the program is executable by a CPU that controls existing personal computers and information terminal devices and the like, thereby enabling the existing devices to serve as the power supply control apparatus according to the disclosure. In addition, a power supply control method according to the disclosure may be implemented using the power supply control apparatus.

In addition, modes of application of such a program may be selected as appropriate. For example, the program may be stored in a flexible disk, a CD-ROM (compact disc read only memory) disk, a DVD (digital versatile disc)-ROM disk, a memory card or any other computer-readable storage medium for implementation thereof. In addition, the program may be superimposed upon a carrier signal so as to be implemented via a communications medium including the Internet. For example, the program may be placed on a BBS (Bulletin Board System) on a communication network for distribution thereof. Further, the above operation may be performed by running the program under control of the operating system (OS) in the same or similar manner as other application programs.

Having described in detail the exemplary embodiments of the disclosure, it should be understood that the disclosure is not limited to such particular embodiments, and that the disclosure encompasses the disclosures claimed in the appended claims and equivalents thereof.

What is claimed is:

1. A printing apparatus comprising:
    a main body;
    a switching device configured to switch between supplying power and stopping supply of power from a first power source to the main body; and
    a power supply control apparatus configured to control the switching device to stop power supply from the first power source to the main body when a power supply disable condition is satisfied in a first state where the main body is powered by the first power source, and configured to control the switching device to supply power from the first power source to the main body when a power supply enable condition is satisfied in a second state where the power supply from the first power source to the main body is stopped;
    a determiner configured to make a determination of whether or not to direct the main body to perform a process associated with print preparation for a print data, wherein the process associated with the print preparation is executable prior to reception of the printing data by the main body, the determination being made upon satisfaction of the power supply enable condition while the main body is in the second state, and the determination being made depending upon any one of factors that causes the satisfaction of the power supply enable condition; and
    an output device configured to output a result of the determination by the determiner to the main body when the main body is powered by the first power source under the control of the switching device by the power supply control apparatus;
    wherein the power supply control apparatus is powered by a second power source when the main body is in the second state, the second power source being different from the first power source.

2. The printing apparatus according to claim 1, wherein the determiner is further configured to:
    determine that the main body should perform the process associated with the print preparation when the power supply enable condition is satisfied as a result of reception of an instruction from a device connected to the main body via a network, the instruction instructing to take the main body out of the second state and place the main body in the first state;
    determine that the main body should not perform the process associated with the print preparation when the power supply enable condition is satisfied as a result of an input operation performed by a user using an input device, the input operation instructing to take the main body out of the second state and place the main body in the first state; and
    determine that the main body should not perform the process associated with the print preparation when the power supply enable condition is satisfied as a result of a determination that a timing has been reached at which the main body is to be taken out of the second state and placed in the first state, the determination being made in accordance with time measurement by a timer.

3. A power supply control apparatus configured to:
    control a switching device to stop power supply from a first power source to a main body of a printing apparatus when a power supply disable condition is satisfied in a first state where the main body is powered by the first power source, the switching device being configured to switch supplying power and stopping supply of power from the first power source to the main body, the power supply disable condition being a condition necessitating stoppage of the power supply from the first power source to the main body; and
    control the switching device to supply power from the first power source to the main body when a power supply enable condition is satisfied in a second state where the power supply from the first power source to the main body is stopped, the power supply enable condition being another condition necessitating the power supply from the first power source to the main body;
    a determiner configured to make a determination of whether or not to direct the printing apparatus to perform a process associated with print preparation for a print data, wherein the process associated with the print preparation is executable prior to reception of the printing data by the printing apparatus, the determination being made upon satisfaction of the power supply enable condition while the printing apparatus is in the second state, and the determination being made depending upon anyone of factors that causes satisfaction of the power supply enable condition; and an output device configured to output a result of the determination by the determiner to the main body when the main body is powered by the first power source under control of the switching device;

wherein the power supply control apparatus is powered by a second power source when the main body is in the second state, the second power source being different from the first power source.

4. The power supply control apparatus according to claim 3, wherein the determiner is configured to:

determine that the printing apparatus should perform the process associated with the print preparation when the power supply enable condition is satisfied as a result of reception of an instruction from a device connected to the printing apparatus via a network, the instruction instructing to take the printing apparatus out of the second state and place the printing apparatus in the first state;

determine that the printing apparatus should not perform the process associated with the print preparation when the power supply enable condition is satisfied as a result of an input operation performed by a user using an input device, the input operation instructing to take the printing apparatus out of the second state and place the printing apparatus in the first state; and determine that the printing apparatus should not perform the process associated with the print preparation when the power supply enable condition is satisfied as a result of a determination that a timing has been reached at which the printing apparatus is to be taken out of the second state and placed in the first state, the determination being made in accordance with time measurement by a timer.

* * * * *